(12) United States Patent
Sattler et al.

(10) Patent No.: US 7,789,554 B2
(45) Date of Patent: Sep. 7, 2010

(54) DOUBLE TEMPERATURE SENSOR

(75) Inventors: Frank Sattler, Lübeck (DE); Hartmut Stark, Stockelsdorf (DE)

(73) Assignee: Drägerwerk Aktiengesellschaft, Lübeck (DE)

( * ) Notice: Subject to any disclaimer, the term of this patent is extended or adjusted under 35 U.S.C. 154(b) by 264 days.

(21) Appl. No.: 11/877,953

(22) Filed: Oct. 24, 2007

(65) Prior Publication Data

US 2008/0170600 A1    Jul. 17, 2008

(30) Foreign Application Priority Data

Jan. 17, 2007   (DE)   ................ 10 2007 002 369

(51) Int. Cl.
  *G01K 7/00*  (2006.01)
  *G01K 1/00*  (2006.01)
  *G01K 3/00*  (2006.01)

(52) U.S. Cl. .................. 374/110; 374/183; 374/208; 374/112; 374/166; 600/549

(58) Field of Classification Search .......... 374/208, 374/183, 166, 112, 110
See application file for complete search history.

(56) References Cited

U.S. PATENT DOCUMENTS

| 2005/0245839 A1* | 11/2005 | Stivoric et al. ............. 600/549 |
| 2006/0047467 A1* | 3/2006 | Bedard et al. ............. 702/130 |
| 2006/0056487 A1* | 3/2006 | Kuroda et al. ............. 374/179 |
| 2007/0038141 A1* | 2/2007 | Koch ............. 600/549 |
| 2007/0282218 A1* | 12/2007 | Yarden ............. 600/549 |

FOREIGN PATENT DOCUMENTS

| DE | 2619471 A | 11/1977 |
| DE | 198 00 753 A | 7/1999 |
| DE | 198 18 170 A1 | 10/1999 |
| DE | 100 38 247 C2 | 12/2002 |
| DE | 101 39 705 A1 | 4/2003 |
| EP | 0 452 141 A2 | 10/1991 |
| GB | 2121181 A | 12/1983 |
| JP | 61120026 A | 6/1986 |

* cited by examiner

*Primary Examiner*—Lisa M Caputo
*Assistant Examiner*—Mirellys Jagan
(74) *Attorney, Agent, or Firm*—McGlew and Tuttle, P.C.

(57) ABSTRACT

A double temperature sensor is provided for measuring a near-surface temperature of the ambient air and the temperature of the skin surface (9). A heat flux insulation block (4) is made of an insulation material in one piece as a housing. Two temperature sensor elements (2, 3) with respective electric connections (6) belonging to them are arranged in the heat flux insulation block (4) one on top of another at spaced locations from one another and near the surface.

19 Claims, 2 Drawing Sheets

DOUBLE TEMPERATURE SENSOR

CROSS REFERENCE TO RELATED APPLICATIONS

This application claims the benefit of priority under 35 U.S.C. §119 of German Patent Application DE 10 2007 002 369.5 filed Jan. 17, 2007, the entire contents of which are incorporated herein by reference.

FIELD OF THE INVENTION

The present invention pertains to a double temperature sensor for measuring a near-surface temperature of the ambient air and the temperature of the skin surface and a process for the use of a double temperature sensor for determining the core temperature of a patient as well as a process for the simultaneous measurement of the skin temperature of a patient and the temperature of the patient's environment.

BACKGROUND OF THE INVENTION

Double temperature sensors are used in the known manner to measure a near-surface temperature of the ambient air and of the skin surface. They are used, for example, in gas masks and breathing equipment for detecting and monitoring the body temperature in order to make it possible to infer the general physiological status of the wearer of the gas mask or breathing equipment. For example, the heat stress of the mission personnel can thus be reduced in case of use in an environment in which large amounts of heat are generated by monitoring the core temperature of the mission personnel and when predetermined limit values are exceeded, the particular member of the mission personnel can leave this area. As is described, for example, in DE 101 39 705 A1, a first temperature sensor element of a double temperature sensor is placed close to the scalp of the member of the mission personnel, whereas a second temperature sensor element separated by a heat-insulating layer detects the temperature near the space.

Double temperature sensors are used in DE 198 18 170 A1 in a process for controlling the operating parameters of an incubator as a function of the heat balance of a patient. The core temperature or the peripheral temperature is determined here from the linkage of a measured skin temperature and the air temperature measured in the incubator and is used to set the air temperature in the incubator.

A double temperature sensor, in which two temperature sensor elements are arranged in a closed sensor housing on two opposite heat-conducting housing parts arranged at spaced locations from one another in a heat-insulating manner, is described in DE 100 38 247 C2. The electric connections to the temperature sensor elements are arranged such that they extend around the temperature sensor elements and are arranged together with these on the heat-conducting housing parts. The heat-conducting housing parts are held mechanically by spacers having poor heat conductivity and thus they seal the sensor housing against the ambient air as completely as possible. It is, furthermore, known from DE 100 38 247 C2 that the two temperature sensor elements are attached to the heat-conducting housing parts with an adhesive. The different materials, especially the heat-insulating layers and the heat-conductive layers arranged in parallel, which must be connected during the manufacture, are disadvantageous in the design of the prior-art double temperature sensor. The adhesive connecting the layers causes tolerances of the heat transfer coefficient of the double temperature sensor. However, the manufacturing tolerances should be as low as possible in order to avoid an individual calibration of the double temperature sensors, which causes costs.

SUMMARY OF THE INVENTION

Based on this, the basic object of the present invention is to perfect a double temperature sensor such that simple manufacture is guaranteed with reproducible precision.

This object is accomplished according to the present invention by a double temperature sensor comprising a heat flux insulation block made of an insulation material in one piece as a housing and two temperature sensor elements with respective electric connections belonging to them, the temperature sensor elements being arranged at spaced locations from one another and one on top of another and near the surface in the heat flux insulation block.

The advantages gained with the present invention are that tolerances of the heat transfer coefficient can be minimized in the double temperature sensor according to the present invention.

This is accomplished especially by the temperature sensor elements being arranged in a heat flux insulation block. The insulation material of the heat flux insulation block has an essentially homogeneous structure. It is guaranteed as a result that the heat flux between the two temperature sensor elements is low and can be determined in advance. The double temperature sensor according to the present invention can be manufactured at a very low cost, preferably according to the injection molding process. An additional operation for applying the heat-conducting housing parts is eliminated.

In a preferred embodiment, the heat flux insulation block consists of a polyether ether ketone (PEEK) material, which can be easily processed according to the injection molding process, on the one hand, and is characterized, on the other hand, by a lower heat conductivity. Other preferred insulation materials of the heat flux insulation block have a heat conductivity between 0.05 W/mK and 0.3 W/mK.

The heat flux insulation block is preferably of a cylindrical shape with two lateral openings, such that the temperature sensor elements can be introduced into and fixed in the openings. However, it is also conceivable that the temperature sensor elements are embedded, together with the electric connections, in the heat flux insulation block by the injection molding process. In another embodiment, the electric connections of the temperature sensor elements may be arranged in the heat flux insulation block in the spiral, circular, meandering, zigzag or star form or in the form of a polygon. It is thus possible to reduce the heat fed in or removed via the electric connections of the temperature sensor elements based on an external temperature disturbance and to correct a temperature measurement that is incorrect as a result. Moreover, the heat conduction of the electric connection can be reduced by the use of reduced wire cross sections and the use of nickel wire instead of copper wire. In another preferred embodiment of the double temperature sensor according to the present invention, the surface of the heat flux insulation block, which surface is intended to be placed on the skin surface, has a concave shape. Optimal heat transfer of the skin temperature to the temperature sensor element is thus advantageously guaranteed. Reducing the section of the heat flux insulation block in the axial direction between the temperature sensor elements makes possible a more compact shape of the double temperature sensor, because the distance between the temperature sensor elements can be reduced due to the air which hinders the heat flux, while the heat transfer coefficient remains comparatively equal.

According to another aspect of the invention, a process is provided for determining the core temperature of a patient. The process comprises providing a heat flux insulation block made in one piece as a housing from an insulation material, the heat flux insulation block having a first surface and a second surface. A first temperature sensor element is disposed in the heat flux insulation block in a location adjacent to the first surface. A first electric connection is connected to the first temperature sensor element with the first electric connection extending into the heat flux insulation block and extending out of the heat flux insulation block. A second temperature sensor element is disposed in the heat flux insulation block in a location adjacent to the second surface with the first temperature sensor elements being arranged at a spaced locations from the second temperature sensor. A second electric connection is connected to the second temperature sensor element with the second electric connection extending into the heat flux insulation block and extending out of the heat flux insulation block. A temperature proportional to the skin temperature of the patient is detected by the first temperature sensor element with the first surface in contact with the skin of the patient. A temperature proportional to ambient air around the patient is detected by the second temperature sensor element. The core temperature of the patient is determined based on the detected temperature proportional to skin temperature and temperature proportional to ambient air.

According to another aspect of the invention a process is provided for using the double temperature sensor for the simultaneous measurement of the skin temperature of a patient and the temperature of the patient's environment.

The present invention is schematically shown on the basis of exemplary embodiments and will be described in detail below with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
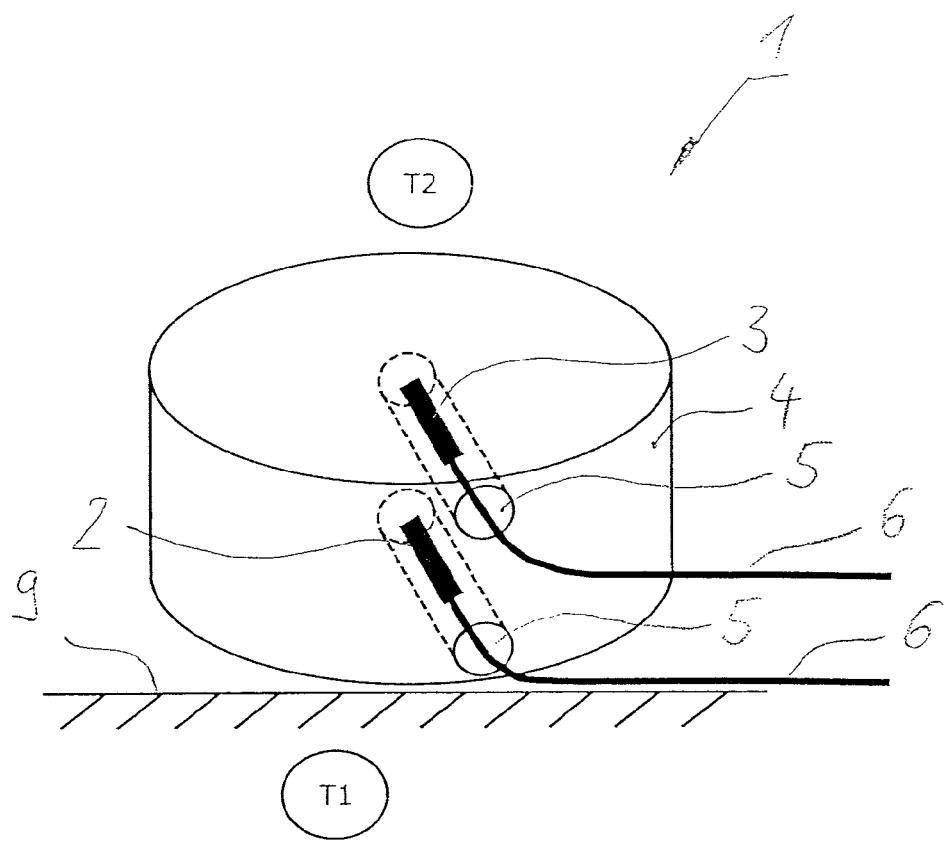
FIG. 1 is a perspective view of a double temperature sensor of a cylindrical design according to the present invention.

Referring to the drawings in particular, FIG. 1 shows a double temperature sensor 1 according to the present invention of a cylindrical design. The double temperature sensor 1 has a heat flux insulation block 4, which is shaped as a housing and is made in one piece. Two temperature sensor elements 2, 3 are arranged in the heat flux insulation block 4 at spaced locations one on top of another and near the surface. The two temperature sensor elements 2, 3 are introduced into openings 5 provided in the heat flux insulation block 4 and are fixed in these. The fixation may be carried out by bonding in the temperature sensor elements 2, 3. The double temperature sensor 1 according to the present invention of a cylindrical shape has a design of a small size with a height of 6 mm and a diameter of 10 mm. However, embodiments with different dimensions may be provided as well. The insulation material of the heat flux insulation block 4 is homogeneous, so that uniform heat flux is guaranteed. The insulation material of the heat flux insulation block 4 is characterized by a heat conductivity between 0.05 W/mK and 0.3 W/mK, and the insulation material of the heat flux insulation block 4 is preferably made of polyetherethorketone (PEEK). However, it is also possible to use materials such as, e.g., polymethyl methacrylate (PMMA), polycarbonate (PC) or polysulfone (PSU).

Figure 2:
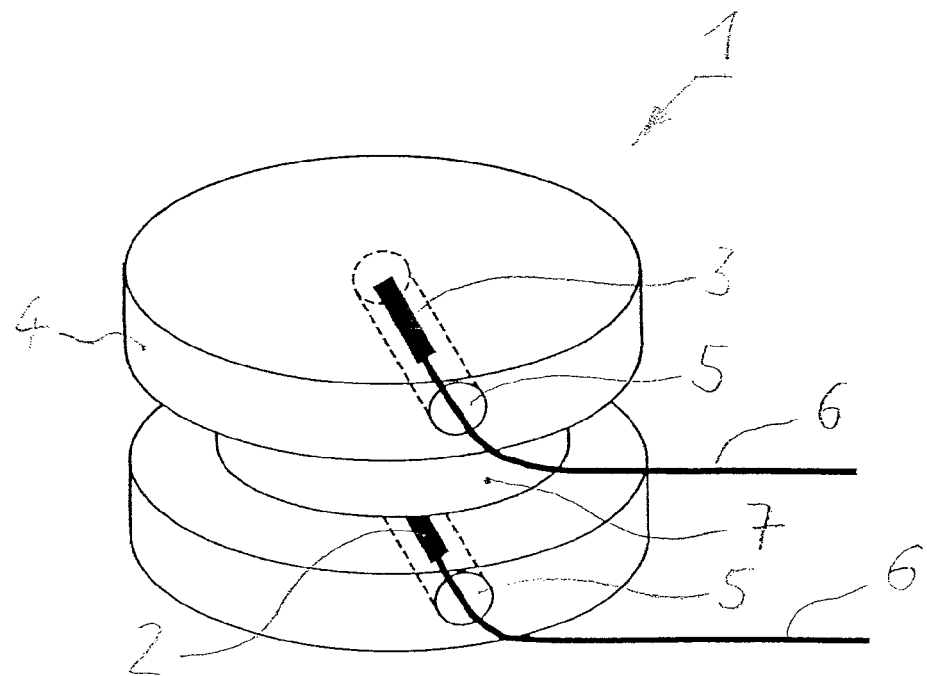
FIG. 2 is a perspective view of the double temperature sensor according to the present invention from FIG. 1 with a reduced section.

The heat flux insulation block 4 may be manufactured in the known manner according to the injection molding process. Space-holders may be provided here for the openings 5 for receiving the temperature sensor elements 2, 3, or the temperature sensor elements 2, 3 are embedded in the heat flux insulation block 4 simultaneously with the manufacture of the heat flux insulation block 4. The electric connections 6 of the temperature sensor elements 2, 3, shown in FIG. 3, may be introduced in the heat flux insulation block 4 simultaneously with the injection molding process and arranged in the heat flux insulation block 4 in a spiral, circular, meandering, zigzag or star form or in the form of a polygon. The temperature sensor elements 2, 3 are preferably temperature-dependent electric resistor elements of an identical design, for example, NTC or PT100 elements. As is shown in FIG. 1, a temperature T1 proportional to the skin surface 9 is detected by a first temperature sensor 2 and a temperature T2 proportional to the ambient air is detected by a second temperature sensor 3. The form of the heat flux insulation block 4 may be designed for the particular application by shaping the injection mold. The surface of the double temperature sensor 1, which is intended for being in contact with the skin surface 9, is preferably concave for optimal heat transfer of the skin temperature to the temperature sensor element 2. The heat transfer coefficient between the two temperature sensor elements 2, 3 of the double temperature sensor 1 according to the present invention can be reduced by reducing the lateral dimension of the heat flux insulation block 4 in the middle section. FIG. 2 shows the double temperature sensor according to the present invention from FIG. 1 with a reduced section 7 in the axial direction between the two temperature sensor elements 2, 3. The reduced section 7 causes a reduction of the heat transfer coefficient due to the very low heat conductivity of air, equaling 0.024 W/mK, and hence a lower heat flux between the two temperature sensor elements 2, 3. The overall axial height of the double temperature sensor 1 can be significantly reduced with this preferred embodiment.

Figure 3:
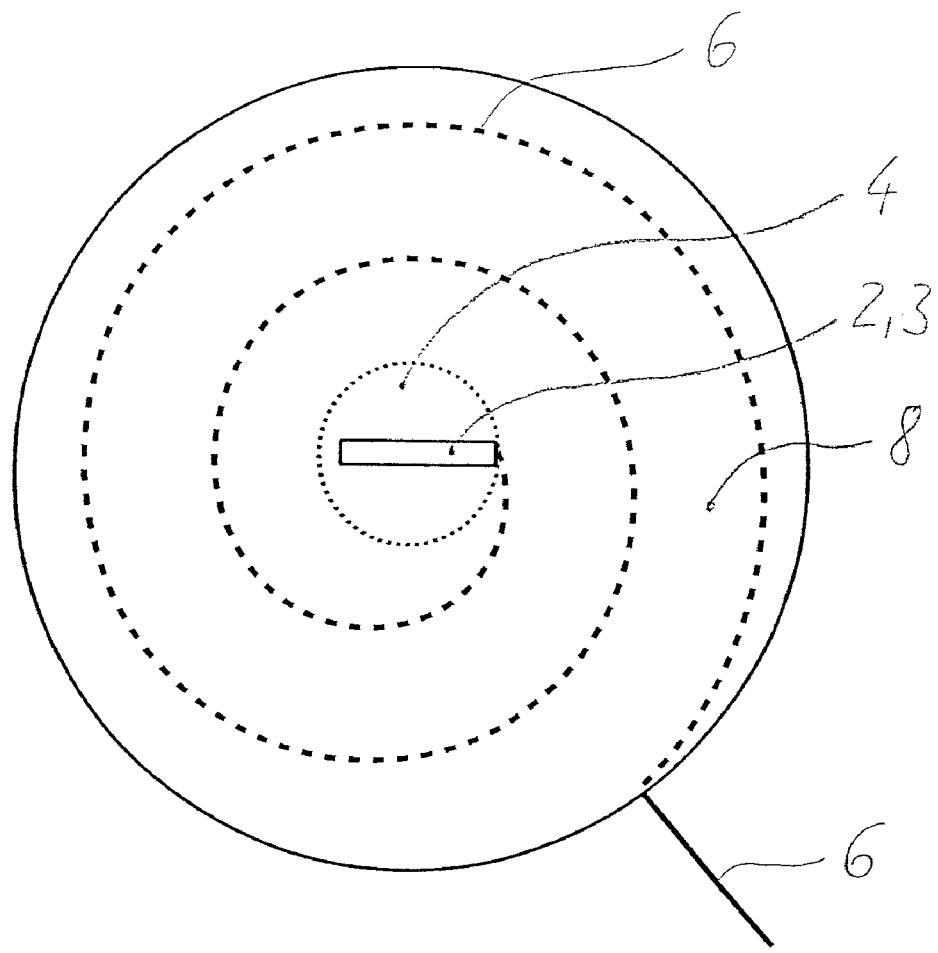
FIG. 3 is a top view of a double temperature sensor according to the present invention with an additional lateral heat insulation part.

FIG. 3 shows a top view of a double temperature sensor 1 according to the present invention with an additional, laterally arranged heat flux insulation part 8. The heat flux insulation part 8 surrounds the heat flux insulation block 4 in the radial direction and is used for lateral temperature insulation. The heat flux insulation part 8 may be made of a material other than that of the heat flux insulation block 4, corresponding to the use of the double temperature sensor 1. In a preferred embodiment, the heat flux insulation block 4 of the double temperature sensor 1 is manufactured in a two-step injection molding process together with the heat flux insulation part 8. The heat flux insulation block 4 is injected in one piece in a first step. The heat flux insulation block 4 is subsequently injected around the heat flux insulation block 4 and is thus thermally connected to the heat flux insulation block 4. It is also conceivable to manufacture the two parts of the same material. The electric connections 6 of the temperature sensor elements 2, 3 are introduced into the heat flux insulation block 4 and arranged circularly in the heat flux insulation block 4. They have a length of approximately 10 cm.

In another embodiment, not shown, the side of the double temperature sensor 1 facing away from the skin surface 9 is provided with a thin heat flux insulation layer in order to prevent an overshooting of the double temperature sensor 1 in case of a sudden temperature change.

While specific embodiments of the invention have been shown and described in detail to illustrate the application of the principles of the invention, it will be understood that the invention may be embodied otherwise without departing from such principles.

What is claimed is:

1. A double temperature sensor for measuring a near-surface temperature of ambient air and the temperature of a skin surface, the double temperature sensor comprising:
    a heat flux insulation block made in one piece as a housing from an insulation material, said heat flux insulation block having a first surface and a second surface;
    two temperature sensor elements with respective electric connections associated with said temperature sensor elements wherein said temperature sensor elements are arranged one on top of another in said heat flux insulation block at spaced locations from one another and each near a respective one of said first surface and said second surface, one of said temperature sensor elements being located opposite said first surface, another one of said temperature sensor elements being located opposite said second surface, said first surface engaging the skin surface, wherein said electric connections of said temperature sensor elements are arranged in said heat flux insulation block in a spiral, circular, meandering, zigzag or star form or in the form of a polygon.

2. A double temperature sensor in accordance with claim 1, wherein said heat flux insulation block has two openings for respectively receiving said temperature sensor elements, into which said temperature sensor elements are introduced and fixed, said insulation block comprising a side surface, one of said two openings extending from one portion of said side surface to at least a position located within said heat flux insulation block, another one of said two openings extending from another portion of said side surface to at least another position located within said heat flux insulation block.

3. A double temperature sensor in accordance with claim 1, wherein said temperature sensor elements are embedded in said heat flux insulation block.

4. A double temperature sensor in accordance with claim 1, wherein a temperature proportional to said skin temperature is detected by a first temperature sensor element and a temperature proportional to the ambient air is detected by a second temperature sensor element.

5. A double temperature sensor in accordance with claim 1, wherein the insulation material of said heat flux insulation block is homogeneous.

6. A double temperature sensor in accordance with claim 1, wherein a surface of said heat flux insulation block has a concave shape.

7. A double temperature sensor in accordance with claim 1, wherein said temperature sensor elements are temperature-dependent electric resistor elements.

8. A double temperature sensor in accordance with claim 1, wherein said temperature sensor elements are of identical design.

9. A double temperature sensor in accordance with claim 1, wherein said heat flux insulation block is of a cylindrical shape.

10. A double temperature sensor in accordance with claim 1, wherein said heat flux insulation block has a first heat flux insulation block portion, a second heat flux insulation block portion and a third heat flux insulation block portion, said second heat flux insulation block portion being integrally connected to said first heat flux insulation block portion and said third heat flux insulation block portion, said first heat flux insulation block portion comprising a first opening, one of said temperature sensors being arranged in said first opening, said third heat flux insulation block portion comprising a second opening, another one of said temperature sensors being arranged in said second opening, said second heat flux insulation block portion being located between said first heat flux insulation block portion and said third heat flux insulation block portion, said first heat flux insulation block portion having a first circumferential dimension, said second heat flux insulation block portion having a second circumferential dimension, said third heat flux insulation block portion having a third circumferential dimension, said second circumferential dimension being less than said first circumferential dimension and said third circumferential dimension.

11. A double temperature sensor in accordance with claim 1, wherein the insulation material of said heat flux insulation block has a heat conductivity between 0.05 W/mK and 0.3 W/mK.

12. A double temperature sensor in accordance with claim 11, wherein the insulation material of said heat flux insulation block is made of Polyetheretherketone (PEEK).

13. A double temperature sensor for measuring a near-surface temperature of ambient air and a temperature of a skin surface, the double temperature sensor comprising:
    a one-piece housing composed of heat flux insulation material, said housing having a first surface and a second surface, said first surface being in contact with the skin surface, said second surface being in contact with the ambient air;
    a first temperature sensor comprising a first electric connection;
    a second temperature sensor comprising a second electric connection, said first temperature sensor and said second temperature sensor being arranged within said housing, said second temperature sensor being arranged at a position above said first temperature sensor, said second temperature sensor being arranged adjacent to said second surface, said first temperature sensor being arranged adjacent to said first surface, said housing having a first opening and a second opening, said first temperature sensor being fixed in said first opening, said second temperature sensor being fixed in said second opening, said housing comprising a side surface, said first opening extending from one portion of said side surface to at least a position located within said housing, said second opening extending from another portion of said side surface to at least another position located within said housing.

14. A double temperature sensor in accordance with claim 13, wherein said heat flux insulation material has a heat conductivity between 0.05 W/mK and 0.3 W/mK.

15. A double temperature sensor in accordance with claim 13, wherein said housing has a first housing portion, a second housing portion and a third housing portion, said second housing portion being integrally connected to said first housing portion and said second housing portion, said first housing portion comprising said first opening, said first temperature sensor being arranged in said first opening, said third housing portion comprising said second opening, said second temperature sensor being arranged in said second opening, said second housing portion being located between said first housing portion and said third housing portion, said first housing portion having a first circumferential dimension, said second housing portion having a second circumferential dimension, said third housing portion having a third circumferential dimension, said second circumferential dimension being less than said first circumferential dimension and said third circumferential dimension.

16. A double temperature sensor in accordance with claim 13, wherein said first electric connection and said second electric connection are arranged in said heat flux insulation material in a spiral, circular, meandering, zigzag or star form or in the form of a polygon.

17. A double temperature sensor for measuring a near-surface temperature of ambient air and a temperature of a skin surface, the double temperature sensor comprising:
- a one-piece housing composed of heat flux insulation material, said housing having a first surface and a second surface, said first surface being in contact with the skin surface, said second surface being in contact with the ambient air;
- a first temperature sensor comprising a first electric connection;
- a second temperature sensor comprising a second electric connection, said first temperature sensor and said second temperature sensor being arranged within said housing, said second temperature sensor being arranged at a position above said first temperature sensor, said second temperature sensor being arranged at a spaced location from said second surface, wherein said heat flux insulation material is arranged between said second surface and said second temperature sensor, said first temperature sensor being arranged at a spaced location from said first surface, wherein said heat flux insulation material is arranged between said first surface and said first temperature sensor.

18. A double temperature sensor in accordance with claim 17, wherein said housing has a first opening and a second opening, said first temperature sensor being fixed in said first opening, said second temperature sensor being fixed in said second opening, said housing comprising a side surface, said first opening extending from one portion of said side surface to at least a position located within said housing, said second opening extending from another portion of said side surface to at least another position located within said housing, wherein said heat flux insulation material has a heat conductivity between 0.05 W/mK and 0.3 W/mK.

19. A double temperature sensor for measuring a near-surface temperature of ambient air and the temperature of a skin surface, the double temperature sensor comprising:
- a heat flux insulation block made in one piece as a housing from an insulation material, said heat flux insulation block having a first surface and a second surface;
- two temperature sensor elements with respective electric connections associated with said temperature sensor elements wherein said temperature sensor elements are arranged one on top of another in said heat flux insulation block at spaced locations from one another and each near a respective one of said first surface and said second surface, one of said temperature sensor elements being located opposite said first surface, another one of said temperature sensor elements being located opposite said second surface, said first surface engaging the skin surface, said heat flux insulation block having two openings for respectively receiving said temperature sensor elements, into which said temperature sensor elements are introduced and fixed, said insulation block comprising a side surface, one of said two openings extending from one portion of said side surface to at least a position located within said heat flux insulation block, another one of said two openings extending from another portion of said side surface to at least another position located within said heat flux insulation block.

* * * * *